(12) United States Patent
Kang et al.

(10) Patent No.: US 10,355,883 B2
(45) Date of Patent: Jul. 16, 2019

(54) SIGNAL DETECTION METHOD AND SIGNAL DETECTION DEVICE (71) Applicant: CHINA ACADEMY OF TELECOMMUNICATIONS TECHNOLOGY, Beijing (CN)

(72) Inventors: Shaoli Kang, Beijing (CN); Bin Ren, Beijing (CN); Hao Liu, Beijing (CN); Qiong Li, Beijing (CN); Qiubin Gao, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 102 days.

(21) Appl. No.: 15/561,357

(22) PCT Filed: Jan. 27, 2016

(86) PCT No.: PCT/CN2016/072269
§ 371 (c)(1),
(2) Date: Sep. 25, 2017

(87) PCT Pub. No.: WO2016/150246
PCT Pub. Date: Sep. 29, 2016

(65) Prior Publication Data
US 2018/0083802 A1 Mar. 22, 2018

(30) Foreign Application Priority Data
Mar. 23, 2015 (CN) .......................... 2015 1 0129081

(51) Int. Cl.
*H04L 25/02* (2006.01)
*H04B 7/04* (2017.01)
(Continued)

(52) U.S. Cl.
CPC .......... *H04L 25/0204* (2013.01); *H04B 7/04* (2013.01); *H04B 7/0617* (2013.01);
(Continued)

(58) Field of Classification Search
CPC . H04L 25/0204; H04L 5/0001; H04L 5/0005; H04B 7/04; H04B 7/06; H04B 7/0802; H04B 7/0848; H04J 15/00
(Continued)

(56) References Cited

U.S. PATENT DOCUMENTS 8,989,320 B2 * 3/2015 Salvekar .............. H04B 1/7107
375/341
2004/0174939 A1 * 9/2004 Wang ...................... H04L 1/005
375/316
(Continued)

FOREIGN PATENT DOCUMENTS

CN 101388872 A 3/2009
CN 102325001 A 1/2012

OTHER PUBLICATIONS

Dai, Zhang, Bai, Chen and Sun; "Pattern Division Multiple Access: A New Multiple Access Technology for 5G"; IEEE Wireless Communications ( vol. 25 , Issue: 2 , Apr. 2018 ); Apr. 30, 2018. (Year: 2018).*
(Continued)

*Primary Examiner* — Thai D Hoang
(74) *Attorney, Agent, or Firm* — Ladas & Parry, LLP (57) ABSTRACT

A signal detection method and a signal detection device are provided. The signal detection method includes steps of: performing channel estimation based on a signal received by each of antennae, to acquire a channel estimation matrix for transmitters multiplexing on identical time-frequency resources on each of the antennae; determining an equivalent Pattern Division Multiple Access (PDMA) channel
(Continued)

estimation matrix for each of the antennae based on a PDMA encoding matrix, and acquiring an equivalent multi-antenna PDMA channel estimation matrix for all the antennae based on the equivalent PDMA channel estimation matrix for each of the antennae; performing a joint detection based on the equivalent multi-antenna PDMA channel estimation matrix, an equivalent multi-antenna received signal vector and a set of constellation points of the transmitters multiplexing on the identical time-frequency resources, to acquire Log Likelihood Ratios (LLRs) for the transmitters; and decoding the LLRs for the transmitters, to acquire multi-user information at transmitting end.

13 Claims, 4 Drawing Sheets

(51) Int. Cl.
*H04L 5/00* (2006.01)
*H04B 7/06* (2006.01)
*H04B 7/08* (2006.01)
*H04J 99/00* (2009.01)
*H04B 7/0452* (2017.01)

(52) U.S. Cl.
CPC ......... *H04B 7/0802* (2013.01); *H04B 7/0848* (2013.01); *H04J 15/00* (2013.01); *H04L 5/0001* (2013.01); *H04L 5/0005* (2013.01); *H04B 7/0452* (2013.01)

(58) Field of Classification Search
USPC ................ 370/252, 328–330, 339, 341–345
See application file for complete search history.

(56) References Cited

U.S. PATENT DOCUMENTS

| | | | |
|---|---|---|---|
| 2007/0033476 A1* | 2/2007 | Osnato | H04L 1/005 714/746 |
| 2008/0256410 A1* | 10/2008 | Park | H04L 1/0668 714/748 |
| 2011/0051860 A1 | 3/2011 | Tang et al. | |
| 2013/0195232 A1 | 8/2013 | Liang et al. | |
| 2014/0153625 A1* | 6/2014 | Vojcic | H04L 1/005 375/224 |
| 2014/0169408 A1 | 6/2014 | Bayesteh et al. | |
| 2017/0163400 A1* | 6/2017 | Wang | H04L 5/0048 |
| 2018/0054218 A1* | 2/2018 | Qian | H03M 13/271 |
| 2018/0337816 A1* | 11/2018 | Herath | H04L 5/0016 |

OTHER PUBLICATIONS

International Preliminary Report on Patentability (IPRP; Ch. 1) for PCT/CN2016/072269, dated Oct. 5, 2017, and its English translation provided by WIPO.
From EPO 16767623.8, Extended European Search Report and Search Opinion dated Mar. 16, 2018.
International Search Report for PCT/CN2016/072269, dated Apr. 14, 2016, and its English translation provided by WIPO.
Written Opinion of the International Search Authority for PCT/CN2016/072269, dated Apr. 14, 2016, and its English translation provided by WIPO.

* cited by examiner

SIGNAL DETECTION METHOD AND SIGNAL DETECTION DEVICE

CROSS-REFERENCE TO RELATED APPLICATIONS

The present application is the U.S. national phase of PCT Application PCT/CN2016/072269 filed on Jan. 27, 2016, which claims priority to the Chinese patent application No. 201510129081.X filed on Mar. 23, 2015, the disclosures of which are incorporated herein by reference in their entireties.

Technical Field

The present disclosure relates to the field of wireless communication, in particular to a signal detection method and a signal detection device.

Background

Along with the rapid development of the wireless communication, the number of users and the service amount have experienced an explosive growth, resulting in a high requirement on a system capacity of a wireless network. It is predicted by researches that, the mobile data service amount will be doubled every year, and in 2020, about 50,000,000,000 User Equipments (UEs) will access to mobile wireless networks. Due to the explosive growth in the number of the UEs, a multiple access technology has become a central issue for update of the network. The multiple access technology determines a basic capacity of the network, and has a great influence on the system complexity and the deployment cost.

For a mobile communication system in the related art (e.g., a $1^{st}$-Generation (1G), $2^{nd}$-Generation (2G), $3^{rd}$-Generation (3G) or $4^{th}$-Generation (4G)) system, an orthogonal multiple access technology, e.g., Frequency Division Multiple Access (FDMA), Time Division Multiple Access (TDMA), Code Division Multiple Access (CDMA) or Orthogonal Frequency Division Multiple Access (OFDMA), is adopted. From the point of a multi-user information theory, it is merely able for an orthogonal mode in the related art to reach an inner bound of the multi-user capacity, resulting in a lower utilization rate of wireless resources.

A Pattern Division Multiple Access (PDMA) technique is a technique capable of performing joint treatment at both a transmitting end and a receiving end on the basis of optimization of a multiple-user communication system. At the transmitting end, the users may be differentiated from each other on the basis of non-orthogonal characteristic patterns for a plurality of signal domains, and at the receiving end, the multiple-user detection may be performed in a Serial Interference Cancellation (SIC) mode on the basis of characteristic structures of user's patterns. In this way, it is able for the users to further multiplex the existing time-frequency wireless resources, thereby to solve the problem that it is merely able for orthogonal mode in the related art to reach the inner bound of the multiple-user capacity and the utilization rate of the wireless resources is low. The SIC belongs to Code Word Interference Cancellation (CWIC).

In PDMA system, the transmitting end may process signals from one or more UEs, perform non-orthogonal characteristic patter mapping on the processed signals so as to superimpose the signals from different UEs on a corresponding wireless resource, and transmit the processed signals from the one or more UEs based on a non-orthogonal characteristic pattern mapping result. The signals from the one or more UEs may be non-orthogonally superimposed on the wireless resource, so it is able to achieve non-orthogonal multiple access transmission, thereby to improve the utilization rate of the wireless resources.

In the PDMA system, the receiving end may detect a non-orthogonal characteristic pattern of the received signals from the UEs so as to determine the non-orthogonal characteristic pattern of the received signals, perform multi-user detection on the received signals in an SIC manner based on the detected non-orthogonal characteristic pattern, and process the received signals so as to determine data from different UEs.

For the pattern design at the transmitting end, a method for designing a code superposition-based multiuser pattern has been presented. To be specific, multiple users may be differentiated from each other through an encoding mode, so as to enable the different users to acquire reasonable, different diversity orders, thereby to enable the multiple users to multiplex the resources in a simple and efficient manner. Correspondingly, at the receiving end, usually a Belief Propagation (BP) detection method or a homogeneous Iterative Detection and Decoding (IDD) detection method may be adopted to detect the signals, so as to acquire better performance.

Figure 1:
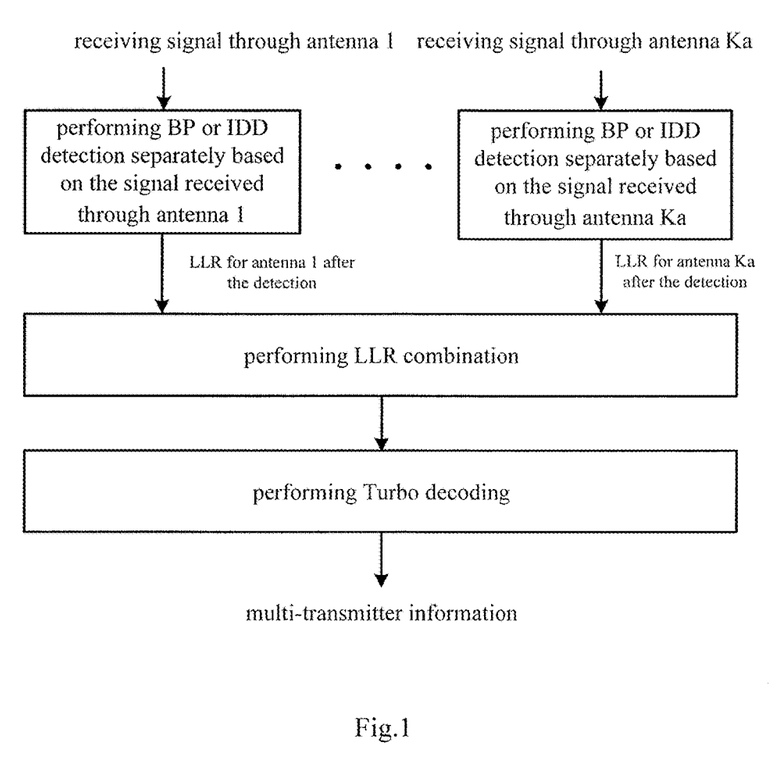
FIG. 1 is a flow chart of a signal detection method for a PDMA system with multiple antennae for data reception in the related art.

Currently, in the case that the signals are received through a plurality of antennae, the data from each antenna may be detected, and then the data from all the antennae may be combined. As shown in FIG. 1 which is a schematic view showing a multi-antenna PDMA detection method in the related art, the signals received by the antennae may be detected separately using the BP or IDD detection method, perform Log Likelihood Ratio (LLR) combination on the data from the antennae, and perform a Turbo decoding operation on the combined data, so as to acquire the multi-user information at the transmitting end.

On the basis of the detection mode in the related art, in the case that there is correlation between the channels from the users to the antennae of the receiving end, the detection accuracy may be adversely affected.

SUMMARY

An object of the present disclosure is to provide a signal detection method and a signal detection device for a PDMA system with multiple antennae for data reception, so as to improve the detection accuracy at the receiving end.

A signal detection method is provided in some embodiments of the present disclosure, including: performing channel estimation based on a signal received by each of antennae, to acquire a channel estimation matrix for transmitters multiplexing on identical time-frequency resources on each of the antennae; determining an equivalent Pattern Division Multiple Access (PDMA) channel estimation matrix for each of the antennae based on a PDMA encoding matrix and the channel estimation matrix for the transmitters multiplexing on the identical time-frequency resources on each of the antennae, and acquiring an equivalent multi-antenna PDMA channel estimation matrix for the antennae based on the equivalent PDMA channel estimation matrix for each of the antennae; performing a joint detection based on the equivalent multi-antenna PDMA channel estimation matrix, an equivalent multi-antenna received signal vector and a set of constellation points of the transmitters multiplexing on the identical time-frequency resources, to acquire Log Likelihood Ratios (LLRs) for the transmitters, where the equivalent multi-antenna received signal vector is formed based on the signals received by the antennae; and decoding the LLRs for the transmitters, to acquire multi-user information at transmitting end.

A signal detection device is further provided in some embodiments of the present disclosure, including: a channel estimation module, configured to perform channel estimation based on a signal received by each of antennae to acquire a channel estimation matrix for transmitters multiplexing on identical time-frequency resources on each of the antennae; an equivalent channel determination module, configured to determine an equivalent Pattern Division Multiple Access (PDMA) channel estimation matrix for each of the antennae based on a PDMA encoding matrix and the channel estimation matrix for the transmitters multiplexing on the identical time-frequency resources on each of the antennae, and acquire an equivalent multi-antenna PDMA channel estimation matrix for the antennae based on the equivalent PDMA channel estimation matrix for each of the antennae; a joint detection module, configured to perform a joint detection based on the equivalent multi-antenna PDMA channel estimation matrix, an equivalent multi-antenna received signal vector and a set of constellation points of the transmitters multiplexing on the identical time-frequency resources to acquire Log Likelihood Ratios (LLRs) for the transmitters, where the equivalent multi-antenna received signal vector is formed based on the signals received by the antennae; and a decoding module, configured to decode the LLRs for the transmitters to acquire multi-user information at transmitting end.

A signal detection device is further provided in some embodiments of the present disclosure, including a processor, a transceiver and a memory. The processor is configured to read a program stored in the memory to: perform channel estimation based on a signal received by each of antennae, to acquire a channel estimation matrix for transmitters multiplexing on identical time-frequency resources on each of the antennae, determine an equivalent Pattern Division Multiple Access (PDMA) channel estimation matrix for each of the antennae based on a PDMA encoding matrix and the channel estimation matrix for the transmitters multiplexing on the identical time-frequency resources on each of the antennae, and acquire an equivalent multi-antenna PDMA channel estimation matrix for the antennae based on the equivalent PDMA channel estimation matrix for each of the antennae, perform a joint detection based on the equivalent multi-antenna PDMA channel estimation matrix, an equivalent multi-antenna received signal vector and a set of constellation points of the transmitters multiplexing on the identical time-frequency resources, to acquire Log Likelihood Ratios (LLRs) for the transmitters, where the equivalent multi-antenna received signal vector is formed based on the signals received by the antennae, and decode the LLRs for the transmitters, to acquire multi-user information at transmitting end. The transceiver is configured to receive and transmit data. The memory is configured to store therein data for the operation of the processor.

According to the embodiments of the present disclosure, the joint detection is performed based on the equivalent multi-antenna PDMA channel estimation matrix, the equivalent multi-antenna received signal vector and the set of constellation points of all the transmitters multiplexing on the identical time-frequency resources so as to acquire the LLR for all the transmitters for transmission, and then the LLR is decoded so as to acquire the multi-user information at the transmitting end. As compared with a signal detection method in the related art where the signal received by each antenna is detected and then the LLR combination is performed on the detection information about all the antennae, due to the joint detection on all the antennae in the embodiments of the present disclosure, it is able to improve the detection performance at the receiving end based on the correlation between channels from the transmitters to the multiple antennae at the receiving end.

DETAILED DESCRIPTION OF THE EMBODIMENTS

With respect to a coding-domain pattern division non-orthogonal multiple access technology, the present disclosure provides in some embodiments a novel method for detecting signals received by multiple antennae, so as to perform joint detection on the signals, thereby to improve the detection performance as compared with the conventional signal detection method where the signal from each antenna is detected and then a combination algorithm is used. Especially for a small-scale encoding matrix, it is able for the detection method in the embodiments of the present disclosure to improve the detection performance more obviously due to the multi-fold growth of the information amount.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Parts of the embodiments of the present disclosure will be described hereinafter, so as to facilitate the understanding of the present disclosure, rather than to define critical or decisive elements of the present disclosure or define the scope of the present disclosure. On the basis of the technical solutions involved in the present disclosure, any other implementations may be acquired through substitutions, without departing from the spirit of the present disclosure.

Figure 2:
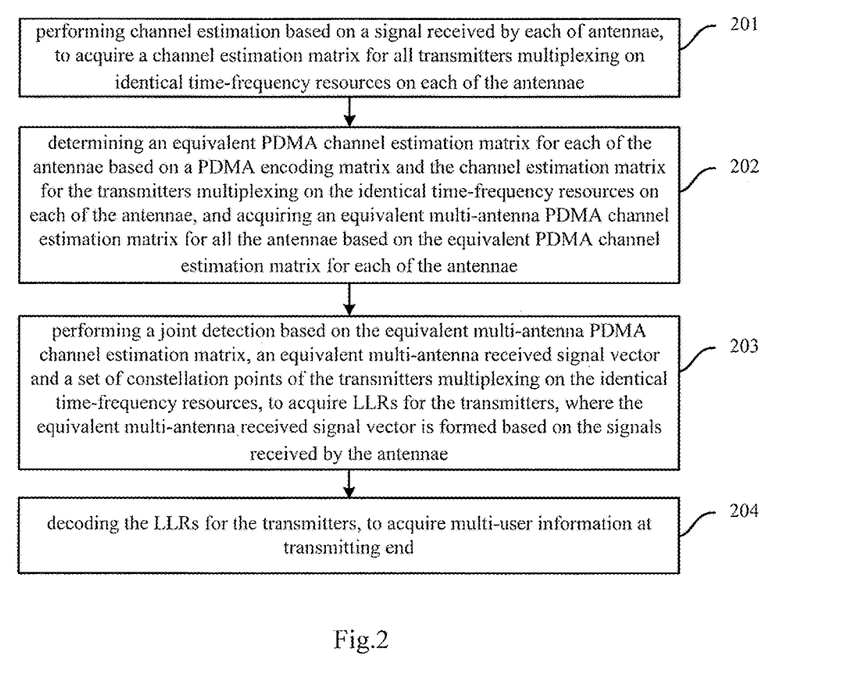
FIG. 2 is a flow chart of a signal detection method for the PDMA system with multiple antennae for data reception in some embodiments of the present disclosure.

As shown in FIG. 2, the present disclosure provides in some embodiments a signal detection method implemented by a signal detection device. The signal detection device may be arranged within a signal reception device which is a device having a capability of receiving a wireless signal and processing the received wireless signal, e.g., a terminal device or a base station. The signal reception device may be provided with at least two antennae for receiving the signal.

The signal detection method may include: Step 201 of performing channel estimation based on a signal received by each of antennae, to acquire a channel estimation matrix for all transmitters multiplexing on identical time-frequency resources on each of the antennae; Step 202 of determining an equivalent Pattern Division Multiple Access (PDMA) channel estimation matrix for each of the antennae based on a PDMA encoding matrix and the channel estimation matrix for the transmitters multiplexing on the identical time-frequency resources on each of the antennae, and acquiring an equivalent multi-antenna PDMA channel estimation matrix for all the antennae based on the equivalent PDMA channel estimation matrix for each of the antennae, where the equivalent multi-antenna PDMA channel estimation matrix is formed based on the equivalent PDMA channel estimation matrixes of all the antennae; Step 203 of performing a joint detection based on the equivalent multi-antenna PDMA channel estimation matrix, an equivalent multi-antenna received signal vector and a set of constellation points of the transmitters multiplexing on the identical time-frequency resources, to acquire Log Likelihood Ratios (LLRs) for the transmitters, where the equivalent multi-antenna received signal vector is formed based on the signals received by the antennae; and Step 204 of decoding the LLRs for the transmitters, to acquire multi-user information at transmitting end.

The signal detection method may be applied to an uplink or a downlink of a communication system. In the case that the signal detection method is applied to the uplink of the communication system, the transmitting end may be a terminal device, and the data from a plurality of terminal devices may be multiplexed and transmitted on an identical time-frequency resources, or a plurality of layers of data from an identical UE may be mapped onto and transmitted on the identical time-frequency resources. Correspondingly, "all the transmitters multiplexing on the identical time-frequency resources" may include all the transmitting terminals that have multiplexed the identical time-frequency resources and are configured to transmit the data, and/or an identical terminal device which is configured to transmit the plurality of layers of data mapped onto the identical time-frequency resources.

According to the embodiments of the present disclosure, the joint detection is performed based on the equivalent multi-antenna PDMA channel estimation matrix, the equivalent multi-antenna received signal vector and the set of constellation points of all the transmitters multiplexing on the identical time-frequency resources so as to acquire the LLR for all the transmitters, and then the LLR is decoded so as to acquire the multi-user information at the transmitting end. As compared with a signal detection method in the related art where the signal received by each antenna is detected and then the LLR combination is performed on the detection information about all the antennae, due to the joint detection on all the antennae in the embodiments of the present disclosure, it is able to improve the detection performance at a receiving end based on the correlation between channels of multiple accesses to the multiple antennae at the receiving end.

The implementation of the signal detection method will be described hereinafter by taking $N_R$ antennae at the receiving end as an example, where the $(n_R)^{th}$ antenna represents any antenna among the $N_R$ antennae, and $1 \leq n_R \leq N_R$.

Based on a communication principle, received signal models for a pilot signal and a data signal on the $(n_R)^{th}$ antenna may be calculated through the following equations respectively: $Y_{PDMA,Data}^{(n_R)} = H_{CH,Pilot}^{(n_R)} X_{PDMA,Pilot}^{new} + N_{Pilot}^{(n_R)}$ (1) and $Y_{PDMA,Data}^{(n_R)} = H_{CH,Data}^{(n_R)} X_{PDMA,Data}^{new} + N_{Data}^{(n_R)}$ (2), where in the equation (1), $H_{CH,Pilot}^{(n_R)}$ represents a channel response to the pilot signal on the $(n_R)^{th}$ antenna, $X_{PDMA,Pilot}^{new}$ represents the pilot signal that has been transmitted, $Y_{PDMA,Pilot}^{(n_R)}$ represents the pilot signal received on the $(n_R)^{th}$ antenna, and $N_{Pilot}^{(n_R)}$ represents a sum of interference and noise of the pilot signal on the $(n_R)^{th}$ antenna, and in the equation (2), $H_{CH,Data}^{(n_R)}$ represents a channel response to the data signal on the $(n_R)^{th}$ antenna, $X_{PDMA,Data}^{new}$ represents the data signal that has been transmitted, $Y_{PDMA,Data}^{(n_R)}$ represents the data signal received on the $(n_R)^{th}$ antenna, and $N_{Data}^{(n_R)}$ represents a sum of interference and noise of the data signal on the $(n_R)^{th}$ antenna.

Through the above-mentioned models, in Step 201, M transmitters that have multiplexed identical N time-frequency Resource Elements (REs) may be separated from each other based on the pilot signal $Y_{PDMA,Pilot}^{(n_R)}$ received on the $(n_R)^{th}$ antenna and the known pilot signal $X_{PDMA,Pilot}^{new}$ transmitted on the $(n_R)^{th}$ antenna, and the channel estimation values of the transmitters may be acquired, so as to acquire the channel estimation matrix $\hat{H}_{CH,Data}^{(n_R)}$ for all the transmitters multiplexing on the identical time-frequency resources on the $(n_R)^{th}$ antenna through the following equations:

$$\hat{H}_{CH,Data}^{(n_R)} = g_{Chest\,type}\{Y_{PDMA,Pilot}^{(n_R)}, X_{PDMA,Pilot}^{new}\} = \begin{bmatrix} \hat{h}_{1,1}^{(n_R)} & \hat{h}_{1,2}^{(n_R)} & \cdots & \hat{h}_{1,M}^{(n_R)} \\ \hat{h}_{2,1}^{(n_R)} & \hat{h}_{2,2}^{(n_R)} & \cdots & \hat{h}_{2,M}^{(n_R)} \\ \vdots & \vdots & \ddots & \vdots \\ \hat{h}_{N,1}^{(n_R)} & \hat{h}_{N,2}^{(n_R)} & \cdots & \hat{h}_{N,M}^{(n_R)} \end{bmatrix}_{N \times M}, \text{and} \quad (3)$$

$$Y_{PDMA,Pilot}^{(n_R)} = \begin{bmatrix} y_{1,Pilot}^{(n_R)} \\ y_{2,Pilot}^{(n_R)} \\ \vdots \\ y_{N,Pilot}^{(n_R)} \end{bmatrix}, \text{and } X_{PDMA,Pilot}^{new} = \begin{bmatrix} X_{1,Pilot} \\ X_{2,Pilot} \\ \vdots \\ X_{M,Pilot} \end{bmatrix}, \quad (4)$$

where $g_{Chest\,type}\{\bullet\}$ represents a function for calculating the channel estimation values using a channel estimator of a Chest type, $Y_{PDMA,Pilot}^{(n_R)}$ represents the pilot signal received on the $(n_R)^{th}$ antenna and on N REs, $X_{PDMA,Pilot}^{new}$ represents the known pilot signal at the transmitting end, $1 \leq n_R \leq N_R$, and $N_R$ represents the total number of the antennae.

The channel estimation may be performed on each antenna in the above-mentioned way, so as to acquire the channel estimation matrix for each antenna.

In Step 202, with respect to each antenna, the equivalent PDMA channel estimation matrix for the current antenna may be calculated based on the PDMA encoding matrix and the channel estimation matrix for the antenna, The PDMA encoding matrix may be notified by the transmitting end (e.g., the base station) to the receiving end (e.g., the terminal device), or pre-agreed in the transmitting end and the receiving end.

Taking the $(n_R)^{th}$ antenna as an example, the equivalent channel estimation matrix $\hat{H}_{PDMA}^{(n_R)}(1 \leq n_R \leq N_R)$ for the antenna may be calculated based on the PDMA encoding matrix $H_{PDMA,Pattern}$ and the channel estimation matrix $\hat{H}_{CH,Data}^{(n_R)}$ for all the transmitters for transmission that have multiplexed the identical time-frequency resources on the antenna through the following equation: $\hat{H}_{PDMA}^{(n_R)} = H_{PDMA,Pattern} \odot \hat{H}_{CH,Data}^{(n_R)}$ (5), where $\odot$ represents an multiplication operation on corresponding elements in the two matrices. A typical PDMA encoding matrix $H_{PDMA,Pattern}$ may be defined as follows:

$$H_{PDMA,Pattern} = \begin{bmatrix} 1 & 1 & \ldots & 0 & 1 & \ldots & 0 \\ 1 & 1 & & 0 & \ldots & 0 & 0 \\ \vdots & \vdots & \ddots & \vdots & \ldots & \vdots & \ddots & \vdots \\ 1 & 0 & \ldots & 1 & & 0 & \ldots & 1 \end{bmatrix}_{N \times M}, \quad (6)$$

where "1" represents the presence of data mapping, and the elements "1" in an identical column represents that an identical data is mapped, and "0" represents the absence of data mapping. The rows represent different REs respectively, and each column represents one data layer. Each UE may occupy one or more data layers, and each data layer may merely be used by one UE.

The equivalent multi-antenna received signal vector $Y_{PDMA}^{new}$ may be formed, through the following equation, by the signal received by each antenna of the $N_R$ antennae for the multi-antenna signal joint detection in Step 203:

$$Y_{PDMA}^{new} = \begin{bmatrix} Y_{PDMA}^{(1)} \\ Y_{PDMA}^{(2)} \\ \vdots \\ Y_{PDMA}^{(N_R)} \end{bmatrix}. \quad (7)$$

The equivalent multi-antenna PDMA channel estimation matrix $\hat{H}_{PDMA}^{new}$ may be formed, through the following equation, by the PDMA equivalent channel estimation matrix for each antenna of the $N_R$ antennae:

$$\hat{H}_{PDMA}^{new} = \begin{bmatrix} \hat{H}_{PDMA}^{(1)} \\ \hat{H}_{PDMA}^{(2)} \\ \vdots \\ \hat{H}_{PDMA}^{(N_R)} \end{bmatrix}. \quad (8)$$

In this regard, the communication model may be represented as $Y_{PDMA}^{new} = H_{PDMA}^{new} X_{PDMA}^{new} + N_{PDMA}^{new}$ (9), where $H_{PDMA}^{new}$ represents an equivalent multi-antenna PDMA channel response matrix determined based on both a channel response matrix $H_{CH,Data}^{(n_R)}$ and the PDMA encoding matrix $H_{PDMA,Pattern}$ for all the antennae in a way identical to $\hat{H}_{PDMA}^{new}$, with the only difference in that the channel matrix for determining $H_{PDMA}^{new}$ is a channel response matrix (corresponding to an ideal channel estimation value), while the channel matrix for determining $\hat{H}_{PDMA}^{new}$ is a real channel estimation matrix.

In Step 203, the joint detection may be performed based on the equivalent multi-antenna PDMA channel estimation matrix $\hat{H}_{PDMA}^{new}$ acquired in Step 202, the equivalent multi-antenna received signal vector $Y_{PDMA}^{new}$ and the set of constellation points of all the transmitters that have multiplexed the identical time-frequency resources, so as to acquire the LLRs for all the transmitters.

Further, in order to simplify the equivalent multi-antenna PDMA channel estimation matrix $\hat{H}_{PDMA}^{new}$ and thereby to reduce the joint detection complexity, in the case that the matrix $\hat{H}_{PDMA}^{new}$ meets a certain condition, linear transformation may be performed on the matrices $\hat{H}_{PDMA}^{new}$ and $Y_{PDMA}^{new}$, and then the joint detection may be performed based on the linearly-transformed matrices $\hat{H}_{PDMA}^{new}$ and $Y_{PDMA}^{new}$ as well as the set of constellation points of all the transmitters that have multiplexed the identical time-frequency resource, so as to acquire the LLRs for all the transmitters.

More specifically, whether or not the equivalent multi-antenna PDMA channel estimation matrix $\hat{H}_{PDMA}^{new}$ and the equivalent multi-antenna received signal matrix $Y_{PDMA}^{new}$ need to be linearly transformed may be determined based on a characteristic of the matrix $\hat{H}_{PDMA}^{new}$. In the case that the linear transformation needs to be performed, the matrices $\hat{H}_{PDMA}^{new}$ and $Y_{PDMA}^{new}$ may be linearly transformed, and then the joint detection may be performed based on the linearly-transformed matrices $\hat{H}_{PDMA}^{new}$ and $Y_{PDMA}^{new}$ as well as the set of constellation points of the transmitters, so as to acquire the LLRs for all the transmitters.

The characteristic of the equivalent multi-antenna PDMA channel estimation channel $\hat{H}_{PDMA}^{new}$ refers to a relationship between the number of rows and the number of columns in the matrix, as well as the number of elements each having a value of 0 in the matrix. In the case that a ratio of the number of the elements each having a value of 0 in the matrix $\hat{H}_{PDMA}^{new}$ to the number of all the elements is smaller than or equal to a decision threshold and the number of the rows is greater than or equal to the number of columns in the matrix $\hat{H}_{PDMA}^{new}$, the linear transformation may be performed on the matrices $\hat{H}_{PDMA}^{new}$ and $Y_{PDMA}^{new}$.

As an example, a decision parameter may be determined through the following equation:

$$\eta = \frac{Num_{zero}}{N \times M}, \quad (1)$$

where $\eta$ represents the decision parameter, $Num_{zero}$ represents the number of the elements that each having a value of 0 in the matrix $\hat{H}_{PDMA}^{new}$, and N and M represent the number of rows and the number of columns in the matrix $\hat{H}_{PDMA}^{new}$ respectively.

In the case that $\eta \leq \eta_{th}$ and $N \geq M$, the linear transformation may be performed on the matrices $\hat{H}_{PDMA}^{new}$ and $Y_{PDMA}^{new}$, where $\eta_{th}$ represents the decision threshold, and $0 < \eta_{th} < 1$.

In the case that $\eta \leq \eta_{th}$, it means that there are relatively few elements that each having a value of 0 in the matrix $\hat{H}_{PDMA}^{new}$. At this time, the linear transformation may be performed on the matrix $\hat{H}_{PDMA}^{new}$, so as to increase the number of the elements that each having a value of 0. In addition, usually only in the case that $N \geq M$, the linear transformation should be performed on the matrix $\hat{H}_{PDMA}^{new}$ using a linear transformation algorithm.

Optionally, $\eta_{th}$ may be provided with a value in such a manner as to ensure that the matrix $\hat{H}_{PDMA}^{new}$ contains sufficient elements each having a value of 0 after the linear transformation. For example, the number of the elements that each having a value of 0 in the matrix $\hat{H}_{PDMA}^{new}$ after the linear transformation may be greater than that in the matrix before the linear transformation, i.e., the linear transformation on the matrix $\hat{H}_{PDMA}^{new}$ just aims to increase the number of the elements that each having a value of 0 in the matrix $\hat{H}_{PDMA}^{new}$. In the matrix $\hat{H}_{PDMA}^{new}$, the more the elements that each having a value of 0, the less the overhead and complexity for the subsequent joint detection.

Optionally, the linear transformation may be performed on the matrix $\hat{H}_{PDMA}^{new}$ through quadrature rectangle (QR) decomposition, or any other linear transformation algorithm.

Taking the QR decomposition as an example, the QR decomposition may be performed on the matrix $\hat{H}_{PDMA}^{new}$ so as to acquire a Q matrix, and then the transformation may be performed on the communication model, i.e., two ends of the above equation (9) may be left-multiplied by a matrix $Q^H$, so as to acquire the following transmission model: $Q^H Y_{PDMA}^{new} = Q^H \hat{H}_{PDMA}^{new} X_{PDMA}^{new} + Q^H N_{PDMA}^{new}$ (11). Taking $Q^H Y_{PDMA}^{new}$ as $Y_{PDMA}^{new1}$, taking $Q^H \hat{H}_{PDMA}^{new}$ as $\hat{H}_{PDMA}^{new1}$ and taking $Q^H N_{PDMA}^{new}$ as $N_{PDMA}^{new1}$, the equation (11) may be expressed as $Y_{PDMA}^{new1} = \hat{H}_{PDMA}^{new1} X_{PDMA}^{new} + N_{PDMA}^{new1}$ (12).

The joint detection may be performed based on the linearly-transformed equivalent multi-antenna received signal matrix $Y_{PDMA}^{new1}$ and the linearly-transformed equivalent multi-antenna channel estimation matrix $\hat{H}_{PDMA}^{new1}$ acquired through the equation (12) as well as a set $\Omega$ of constellation points of the transmitters, so as to acquire the LLRs for all the transmitters for transmission after the detection through the following equation: $LLR_{new}(X_m) = f_{Detection\ Type}\{Y_{PDMA}^{new1}, \hat{H}_{PDMA}^{new1}, \Omega\}$ ($1 \leq m \leq M$) (13), where $f_{Detection\ Type}\{\bullet\}$ represents a function for calculating the LLR using a detector of a Detection Type, $X_m$ represents a signal from the $m^{th}$ UE, and $1 \leq m \leq M$.

Further, in the case that the condition where $\eta \leq \eta_{th}$ and $N \geq M$ has not been met, the joint detection may be performed based on the equivalent multi-antenna received signal matrix $Y_{PDMA}^{new}$ and the equivalent multi-antenna channel estimation matrix $\hat{H}_{PDMA}^{new}$ acquired in Step 202 as well as the set $\Omega$ of constellation points of all the transmitters that have multiplexed the identical time-frequency resources, so as to acquire the LLRs for all the transmitters for transmission after the detection through the following equation: $LLR_{new}(X_m) = \eta_{Detection\ Type}\{Y_{PDMA}^{new}, \hat{H}_{PDMA}^{new}, \Omega\}$ ($1 \leq m \leq M$) (14).

In Step 204, a Turbo decoding operation may be performed on the LLRs acquired after the detection in Step 203, i.e., the Turbo decoding operation may be performed on the LLR of each UE, so as to acquire the multi-user information at the transmitting end.

As mentioned above, the joint detection may be performed based on the equivalent multi-antenna PDMA channel estimation matrix and the equivalent multi-antenna received signal matrix for all the antennae as well as the set of constellation points for all the transmitters for transmission that have multiplexed the identical time-frequency resources so as to acquire the LLRs for all the transmitters for transmission. Then, the LLRs may be decoded, so as to acquire the multi-user information at the transmitting end. As compared with a signal detection method in the related art where the signal received by each antenna is detected and then the LLR combination is performed on the detection information about all the antennae, due to the joint detection on all the antennae in the embodiments of the present disclosure, it is able to improve the detection performance at the receiving end based on the complete reception information and the correlation between channels from the multiple accesses to the multiple antennae at the receiving end. In addition, whether or not the linear transformation needs to be performed on the equivalent PDMA multi-antenna channel estimation matrix may be determined based on the characteristic of the equivalent PDMA multi-antenna channel estimation matrix, e.g., the relationship between the number of rows and the number of columns of the matrix as well as the number of the elements that each having a value of 0 in the matrix, so as to simplify the channel estimation matrix for the joint detection, thereby to reduce the processing complexity of a joint detection algorithm. Further, it is able to improve the detection performance as compared with the conventional signal detection method where the signal from each antenna is detected and then a combination algorithm is used. Especially for a small-scale encoding matrix, it is able for the signal detection method in the embodiments of the present disclosure to improve the detection performance more obviously due to the multi-fold growth of the information amount.

For ease of understanding, the present disclosure will be described hereinafter in more details.

In some embodiments of the present disclosure, a 1Tx2Rx and 2RE3UE transmission mode may be adopted in an uplink direction. 1Tx2Rx represents the existence of one transmission antenna and two reception antennae (i.e., the number of antennae at the receiving end $N_R = 2$), and 2RE3UE represents that the data for three transmitters is transmitted on two REs. The decision threshold $\eta_{th} = 0.5$, and a BP algorithm is adopted for the joint detection.

The PDMA encoding matrix $H_{PDMA,Pattern}$ may be defined through the following equation:

$$H_{PDMA,Pattern} = \begin{bmatrix} 1 & 1 & 0 \\ 1 & 0 & 1 \end{bmatrix}_{2 \times 3}, \quad (15)$$

where "1" represents the presence of data mapping, the elements "1" in an identical column represents that an identical data is mapped, and "0" represents the absence of data mapping. The rows represent different REs respectively, and each column represents one data layer. Each UE may occupy merely one data layer.

In Step 201, the channel estimation may be performed on the signal received by each antenna in the $N_R$ ($N_R = 2$) antennae, so as to acquire the channel estimation matrix for all the transmitters that have multiplexed the identical time-frequency resources on each antenna.

To be specific, the transmitters that have multiplexed the identical two REs may be separated from each other based on a received pilot signal $Y_{PDMA}^{(n_R)}$ and a known transmitted pilot signal $X_{PDMA,Pilot}^{new}$ on each antenna, and channel estimation values of all the three transmitters may be acquired, so as to acquire the channel estimation matrix $\hat{H}_{CH}^{(n_R)}$ for all the transmitters that have multiplexed the identical time-frequency resources on the $(n_R)^{th}$ antenna through the following equations:

$$\hat{H}_{CH}^{(n_R)} = g_{MMSE}\{Y_{PDMA,Pilot}^{(n_R)}, X_{PDMA,Pilot}^{new}\} = \begin{bmatrix} \hat{h}_{1,1}^{(n_R)} & \hat{h}_{1,2}^{(n_R)} & \hat{h}_{1,3}^{(n_R)} \\ \hat{h}_{2,1}^{(n_R)} & \hat{h}_{2,2}^{(n_R)} & \hat{h}_{2,3}^{(n_R)} \end{bmatrix}_{2 \times 3}, \quad (16)$$

and $$Y_{PDMA,Pilot}^{(n_R)} = \begin{bmatrix} y_{1,Pilot}^{(n_R)} \\ y_{2,Pilot}^{(n_R)} \end{bmatrix} \text{ and } X_{PDMA,Pilot}^{new} = \begin{bmatrix} X_{1,Pilot} \\ X_{2,Pilot} \\ X_{3,Pilot} \end{bmatrix}. \quad (17)$$

The channel estimation may be performed using a Minimum Mean Square Error (MMSE) estimator, and the transmitters may be separated from each other on the basis of phase. In the equations, $g_{Chest\ type}\{\bullet\}$ represents a function for calculating the channel estimation value using a channel estimator of a Chest type, $Y_{PDMA,Pilot}^{(n_R)}$ represents the received pilot signal on the $(n_R)^{th}$ antenna and on the two REs, $X_{PDMA}^{new}$ represents the known transmitted pilot signal, and $1 \le n_R \le 2$.

In Step 202, the equivalent channel estimation matrix $H_{PDMA}^{(n_R)}$ ($1 \le n_R \le 2$) for each antenna may be calculated based on the PDMA encoding matrix $H_{PDMA,Pattern}$ and the channel estimation matrix $\hat{H}_{CH}^{(n_R)}$ for all the transmitters that have multiplexed the identical time-frequency resources on each antenna through the following equation: $\hat{H}_{PDMA}^{(n_R)} = H_{PDMA,Pattern} \odot \hat{H}_{CH}^{(n_R)}$ (18), where $\odot$ represents an multiplication operation on corresponding elements in the two matrices.

The equivalent multi-antenna received signal matrix $Y_{PDMA}^{new}$ may be formed, through the following equation, by the signal $Y_{PDMA}^{(n_R)}$ received by each antenna of the $N_R$ antennae:

$$Y_{PDMA}^{new} = \begin{bmatrix} Y_{PDMA}^{(1)} \\ Y_{PDMA}^{(2)} \end{bmatrix}. \quad (19)$$

The equivalent multi-antenna PDMA channel estimation matrix $\hat{H}_{PDMA}^{new}$ may be formed, through the following equation, by the PDMA equivalent channel estimation matrix $H_{PDMA}^{n_R}$ for each antenna of the $N_R$ antennae:

$$\hat{H}_{PDMA}^{new} = \begin{bmatrix} \hat{H}_{PDMA}^{(1)} \\ \hat{H}_{PDMA}^{(2)} \end{bmatrix} = \begin{bmatrix} 1*h_{1,1}^{(1)} & 1*h_{1,2}^{(1)} & 0*h_{1,3}^{(1)} \\ 1*h_{2,1}^{(1)} & 0*h_{2,2}^{(1)} & 1*h_{2,3}^{(1)} \\ 1*h_{1,1}^{(2)} & 1*h_{1,2}^{(2)} & 0*h_{1,3}^{(2)} \\ 1*h_{2,1}^{(2)} & 0*h_{2,2}^{(2)} & 1*h_{2,3}^{(2)} \end{bmatrix}. \quad (20)$$

Hence, the communication model may be represented as:

$$Y_{PDMA}^{new} = \hat{H}_{PDMA}^{new} X_{PDMA}^{new} + N_{PDMA}^{new} \quad (21)$$

$$\begin{bmatrix} y_1^{(1)} \\ y_2^{(1)} \\ y_1^{(2)} \\ y_2^{(2)} \end{bmatrix} = \begin{bmatrix} 1*h_{1,1}^{(1)} & 1*h_{1,2}^{(1)} & 0 \\ 1*h_{2,1}^{(1)} & 0 & 1*h_{2,3}^{(1)} \\ 1*h_{1,1}^{(2)} & 1*h_{1,2}^{(2)} & 0 \\ 1*h_{2,1}^{(2)} & 0 & 1*h_{2,3}^{(2)} \end{bmatrix} \begin{bmatrix} x_1 \\ x_2 \\ x_3 \end{bmatrix} + \begin{bmatrix} n_1^{(1)} \\ n_2^{(1)} \\ n_1^{(2)} \\ n_2^{(2)} \end{bmatrix}.$$

In Step 203, a value of the decision parameter $\eta$ may be calculated. $\eta = 4/12 = 1/3$, i.e., the value of the decision parameter $\eta$ is smaller than the decision threshold $\eta_{th}$ ($\eta_{th} = 0.5$), and the number of rows of the matrix $\hat{H}_{PDMA}^{new}$ is greater than the number of its columns, so the linear transformation needs to be performed on the matrices $\hat{H}_{PDMA}^{new}$ and $Y_{PDMA}^{new}$.

The QR decomposition may be performed on the matrix $\hat{H}_{PDMA}^{new}$, and then the two ends of the equation (21) may be left-multiplied by the matrix $Q^H$, so as to acquire the following equations:
$Q^H Y_{PDMA}^{new} = Q^H \hat{H}_{PDMA}^{new} X_{PDMA}^{new} Q^H N_{PDMA}^{new}$, $$Y_{PDMA}^{new'} = \hat{H}_{PDMA}^{new'} X_{PDMA}^{new} + N_{PDMA}^{new'}, \text{ and} \quad (22)$$

$$\begin{bmatrix} y_1^{(1)'} \\ y_2^{(1)'} \\ y_1^{(2)'} \\ y_2^{(2)'} \end{bmatrix} = \begin{bmatrix} 1*h_{1,1}^{(1)'} & 1*h_{1,2}^{(1)'} & 1*h_{1,2}^{(1)'} \\ 0 & 1*h_{1,2}^{(1)'} & 1*h_{2,3}^{(1)'} \\ 0 & 0 & 1*h_{1,3}^{(2)'} \\ 0 & 0 & 0 \end{bmatrix} \begin{bmatrix} x_1 \\ x_2 \\ x_3 \end{bmatrix} + \begin{bmatrix} n_1^{(1)'} \\ n_2^{(1)'} \\ n_1^{(2)'} \\ n_2^{(2)'} \end{bmatrix}.$$

The BP joint detection may be performed based on the equivalent multi-antenna received signal $Y_{PDMA}^{new'}$ and the equivalent multi-antenna PDMA channel estimation matrix $\hat{H}_{PDMA}^{new'}$ acquired through the above equations as well as the set $\Omega$ of constellation points of the all the transmitters that have multiplexed the identical time-frequency resources, so as to acquire the LLRs for all the transmitters after the detection through the following equations:

$$LLR_{new}(X_m) = f_{BP}\{Y_{PDMA}^{new'}, \hat{H}_{PDMA}^{new'}, \Omega\} (1 \le m \le M), \text{ and} \quad (23)$$

$$f_{BP}\{Y_{PDMA}^{new'}, \hat{H}_{PDMA}^{new'}, \Omega\} = \quad (24)$$

$$\min_{X_{PDMA,m}^{new} \in D^{M \setminus (+1)}} \left( \left\| Y_{PDMA}^{new'} - \hat{H}_{PDMA}^{new'} X_{PDMA}^{new} \right\|_2^2 \right) -$$

$$\min_{X_{PDMA,m}^{new} \in D^{M \setminus (-1)}} \left( \left\| Y_{PDMA}^{new'} - \hat{H}_{PDMA}^{new'} X_{PDMA}^{new} \right\|_2^2 \right),$$

where $f_{BP}\{\bullet\}$ represents a function for calculating the LLR using a detector of a BP type, $X_m$ represents a signal from the $m^{th}$ UE, and $1 \le m \le 3$.

In Step 204, the LLRs for the transmitters acquired in Step 203 after the detection may be decoded by a Turbo decoding module, so as to acquire the original multi-user information from the transmission end.

Figure 3:
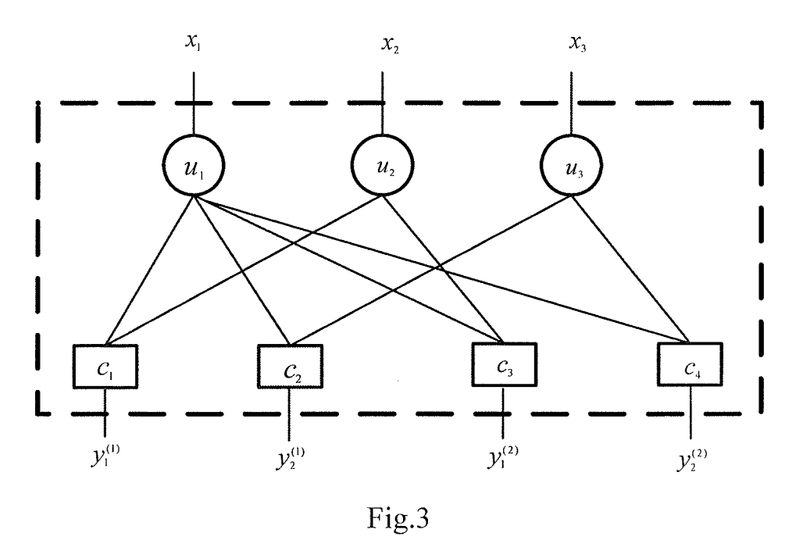
FIG. 3 is a schematic view showing a BP detection procedure in some embodiments of the present disclosure.

FIG. 3 shows a BP detection procedure in Step 203.

In some other embodiments of the present disclosure, a 1Tx2Rx and 3RE7UE transmission mode may be adopted in an uplink direction including. 1Tx2Rx represents the existence of one transmission antenna and two reception antennae (i.e., the number of antennae at the receiving end $N_R = 2$), and 3RE7UE represents that the data for seven transmitters is transmitted on three REs. The decision threshold $\eta_{th} = 0.5$, and a BP algorithm is adopted for the joint detection.

The PDMA encoding matrix $H_{PDMA,Pattern}$ is a 3×7 matrix, i.e., M=3 and N=7. The PDMA encoding matrix $H_{PDMA,Pattern}$ may be defined through the following equation:

$$H_{PDMA,Pattern} == \begin{bmatrix} 1 & 1 & 0 & 1 & 1 & 0 & 0 \\ 1 & 1 & 1 & 0 & 0 & 1 & 0 \\ 1 & 0 & 1 & 1 & 0 & 0 & 1 \\ \binom{3}{3}=1 & \binom{3}{2}=3 & & \binom{3}{1}=3 & & & \end{bmatrix}, \quad (25)$$

where "1" represents the presence of data mapping, the elements "1" in an identical column represents that an identical data is mapped, and "0" represents the absence of data mapping. The rows represent different REs respectively, and each column represents one data layer. Each UE may occupy merely one data layer.

In Step 201, the channel estimation may be performed on the signal received by ach antenna in the $N_R$ ($N_R = 2$) antennae, so as to acquire the channel estimation matrix for all the transmitters that have multiplexed the identical time-frequency resources on each antenna.

To be specific, the transmitters that have multiplexed the identical three REs may be separated from each other based on the received pilot signal $Y_{PDMA,Pilot}^{(n_R)}$ and the known transmitted pilot signal $X_{PDMA,Pilot}^{new}$ on each antenna, and channel estimation values of all the seven transmitters may be acquired, so as to acquire the channel estimation matrix $\hat{H}_{CH}^{(n_R)}$ for all the transmitters that have multiplexed the identical time-frequency resources on the $(n_R)^{th}$ antenna through the following equations:

$$\hat{H}_{CH}^{(n_R)} = g_{MMSE}\{Y_{PDMA,Pilot}^{(n_R)}, X_{PDMA,Pilot}^{new}\} = \begin{bmatrix} \hat{h}_{1,1}^{(n_R)} & \hat{h}_{1,2}^{(n_R)} & \hat{h}_{1,3}^{(n_R)} & \hat{h}_{1,4}^{(n_R)} & \hat{h}_{1,5}^{(n_R)} & \hat{h}_{1,6}^{(n_R)} & \hat{h}_{1,7}^{(n_R)} \\ \hat{h}_{2,1}^{(n_R)} & \hat{h}_{2,2}^{(n_R)} & \hat{h}_{2,3}^{(n_R)} & \hat{h}_{2,4}^{(n_R)} & \hat{h}_{2,5}^{(n_R)} & \hat{h}_{2,6}^{(n_R)} & \hat{h}_{2,7}^{(n_R)} \\ \hat{h}_{3,1}^{(n_R)} & \hat{h}_{3,2}^{(n_R)} & \hat{h}_{3,3}^{(n_R)} & \hat{h}_{3,4}^{(n_R)} & \hat{h}_{3,5}^{(n_R)} & \hat{h}_{3,6}^{(n_R)} & \hat{h}_{3,7}^{(n_R)} \end{bmatrix}_{3\times 7}, \text{ and} \quad (26)$$

$$Y_{PDMA,Pilot}^{(n_R)} = \begin{bmatrix} y_{1,Pilot}^{(n_R)} \\ y_{2,Pilot}^{(n_R)} \\ y_{3,Pilot}^{(n_R)} \end{bmatrix} \text{ and } X_{PDMA,Pilot}^{new} = \begin{bmatrix} X_{1,Pilot} \\ X_{2,Pilot} \\ X_{3,Pilot} \\ X_{4,Pilot} \\ X_{5,Pilot} \\ X_{6,Pilot} \\ X_{7,Pilot} \end{bmatrix}. \quad (27)$$

The channel estimation may be performed using the Minimum Mean Square Error (MMSE) estimator, and the transmitters may be separated from each other on the basis of phase. In the equations, $g_{Chest\ type}\{\bullet\}$ represents a function for calculating the channel estimation value using a channel estimator of a Chest type, $Y_{PDMA,Pilot}^{(n_R)}$ represents the received pilot signal on the $(n_R)^{th}$ antenna and on the three REs, $X_{PDMA,Pilot}^{new}$ represents the known transmitted pilot signal, and $1 \leq n_R \leq 2$.

In Step 202, the equivalent channel estimation matrix $H_{PDMA}^{(n_R)}$ ($1 \leq n_R \leq 2$) for each antenna may be calculated based on the PDMA encoding matrix $H_{PDMA,Pattern}$ and the channel estimation matrix $H_{PDMA}^{(n_R)}$ ($1 \leq n_R \leq 2$) for all the transmitters that have multiplexed the identical time-frequency resources on each antenna through the following equation: $\hat{H}_{PDMA}^{(n_R)} = H_{PDMA,Pattern} \odot \hat{H}_{CH}^{(n_R)}$ (28), where $\odot$ represents an multiplication operation on corresponding elements in the two matrices.

The equivalent multi-antenna received signal matrix $Y_{PDMA}^{new}$ may be formed, through the following equation, by the signal $Y_{PDMA}^{(n_R)}$ received by each antenna of the $N_R$ antennae:

$$Y_{PDMA}^{new} = \begin{bmatrix} Y_{PDMA}^{(1)} \\ Y_{PDMA}^{(2)} \end{bmatrix}. \quad (29)$$

The equivalent multi-antenna PDMA channel estimation matrix $\hat{H}_{PDMA}^{new}$ may be formed, through the following equation, by the PDMA equivalent channel estimation matrix $H_{PDMA}^{n_R}$ for each antenna of the $N_R$ antennae:

$$\hat{H}_{PDMA}^{new} = \begin{bmatrix} \hat{H}_{PDMA}^{(1)} \\ \hat{H}_{PDMA}^{(2)} \end{bmatrix} = \begin{bmatrix} \hat{h}_{1,1}^{(1)} & \hat{h}_{1,2}^{(1)} & 0 & \hat{h}_{1,4}^{(1)} & \hat{h}_{1,5}^{(1)} & 0 & 0 \\ \hat{h}_{2,1}^{(1)} & \hat{h}_{2,2}^{(1)} & \hat{h}_{2,3}^{(1)} & 0 & 0 & \hat{h}_{2,6}^{(1)} & 0 \\ \hat{h}_{3,1}^{(1)} & 0 & \hat{h}_{3,3}^{(1)} & \hat{h}_{3,4}^{(1)} & 0 & 0 & \hat{h}_{3,7}^{(1)} \\ \hat{h}_{1,1}^{(2)} & \hat{h}_{1,2}^{(2)} & 0 & \hat{h}_{1,4}^{(2)} & \hat{h}_{1,5}^{(2)} & 0 & 0 \\ \hat{h}_{2,1}^{(2)} & \hat{h}_{2,2}^{(2)} & \hat{h}_{2,3}^{(2)} & 0 & 0 & \hat{h}_{2,6}^{(2)} & 0 \\ \hat{h}_{3,1}^{(2)} & 0 & \hat{h}_{3,3}^{(2)} & \hat{h}_{3,4}^{(2)} & 0 & 0 & \hat{h}_{3,7}^{(2)} \end{bmatrix}. \quad (30)$$

Hence, the communication model may be represented as:

$$\begin{bmatrix} y_1^{(1)} \\ y_2^{(1)} \\ y_3^{(1)} \\ y_1^{(2)} \\ y_2^{(2)} \\ y_3^{(2)} \end{bmatrix} = \begin{bmatrix} \hat{h}_{1,1}^{(1)} & \hat{h}_{1,2}^{(1)} & 0 & \hat{h}_{1,4}^{(1)} & \hat{h}_{1,5}^{(1)} & 0 & 0 \\ \hat{h}_{2,1}^{(1)} & \hat{h}_{2,2}^{(1)} & \hat{h}_{2,3}^{(1)} & 0 & 0 & \hat{h}_{2,6}^{(1)} & 0 \\ \hat{h}_{3,1}^{(1)} & 0 & \hat{h}_{3,3}^{(1)} & \hat{h}_{3,4}^{(1)} & 0 & 0 & \hat{h}_{3,7}^{(1)} \\ \hat{h}_{1,1}^{(2)} & \hat{h}_{1,2}^{(2)} & 0 & \hat{h}_{1,4}^{(2)} & \hat{h}_{1,5}^{(2)} & 0 & 0 \\ \hat{h}_{2,1}^{(2)} & \hat{h}_{2,2}^{(2)} & \hat{h}_{2,3}^{(2)} & 0 & 0 & \hat{h}_{2,6}^{(2)} & 0 \\ \hat{h}_{3,1}^{(2)} & 0 & \hat{h}_{3,3}^{(2)} & \hat{h}_{3,4}^{(2)} & 0 & 0 & \hat{h}_{3,7}^{(2)} \end{bmatrix} \begin{bmatrix} x_1 \\ x_2 \\ x_3 \\ x_4 \\ x_5 \\ x_6 \\ x_7 \end{bmatrix} + \begin{bmatrix} n_1^{(1)} \\ n_2^{(1)} \\ n_3^{(1)} \\ n_1^{(2)} \\ n_2^{(2)} \\ n_3^{(2)} \end{bmatrix}. \quad (31)$$

In Step 203, a value of the decision parameter $\eta$ may be calculated. $\eta = 18/42 = 3/7$, i.e., the value of the decision parameter $\eta$ is smaller than the decision threshold $\eta_{th}$ ($n_{th} = 0.5$), and the number of rows of the matrix $\hat{H}_{PDMA}^{new}$ is smaller than the number of its columns, so the joint detection may be performed based on the equivalent multi-antenna received signal $Y_{PDMA}^{(n_R)}$ and the equivalent multi-antenna PDMA channel estimation matrix $\hat{H}_{PDMA}^{new}$ acquired in Step 202 as well as the set $\Omega$ of the constellation points of the transmitters, so as to acquire the LLRs for all the transmitters after the detection through the following equation: $LLR_{new}(X_m) = f_{Detection\ Type}\{Y_{PDMA}^{new}, \hat{H}_{PDMA}^{new}, \Omega\}$ ($1 \leq m \leq 7$) (32), where $f_{BP}\{\bullet\}$ represents a function for calculating the LLR using a detector of a BP type, $X_m$ represents a signal from the $m^{th}$ UE, and $1 \leq m \leq 7$.

In Step 204, the LLRs for the transmitters acquired in Step 203 after the detection may be decoded by the Turbo decoding module, so as to acquire the original multi-user information from the transmission end.

Figure 4:
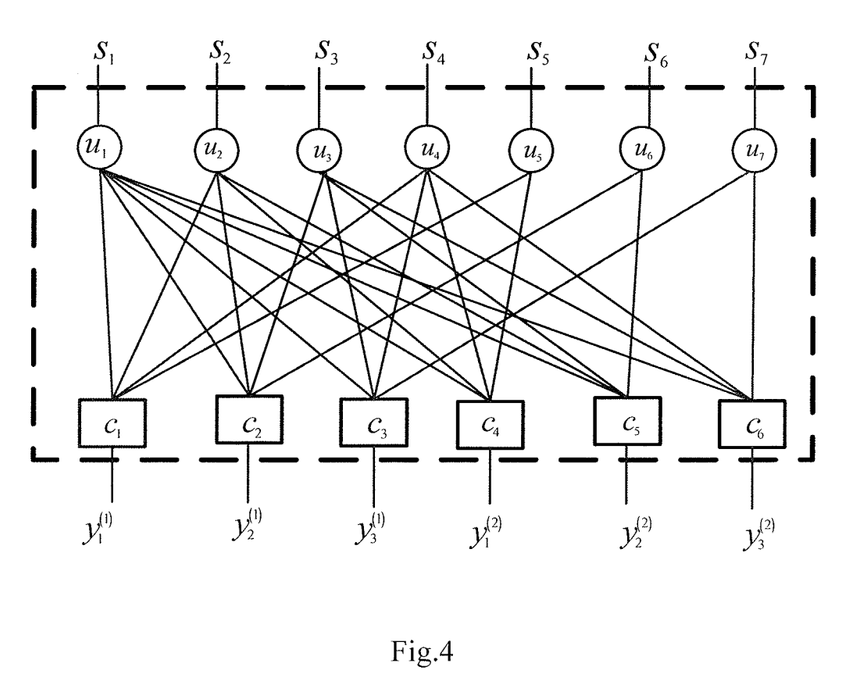
FIG. 4 is another schematic view showing the BP detection procedure in some embodiments of the present disclosure.

FIG. 4 shows a BP detection procedure in Step 203.

In order to compare the signal detection algorithm in the embodiments of the present disclosure with a signal detection algorithm in the related art, a procedure of adopting the traditional signal detection algorithm will be described hereinafter by taking the above-mentioned situation as an example.

In a scenario where the data from three transmitters is transmitted on two REs, the data is transmitted at the transmitting end through a single antenna and the data is received at the receiving end through two antennae, the PDMA encoding matrix $H_{PDMA,Pattern}$ may be defined as follows:

$$H_{PDMA,Pattern} = \begin{bmatrix} 1 & 1 & 0 \\ 1 & 0 & 1 \end{bmatrix}_{2\times 3}. \quad (33)$$

A PDMA system model may be expressed as:

$$y^{(1)} = H^{(1)}x + n^{(1)} = (H_{CH}^{(1)} \odot H_{PDMA})x + n^{(1)} \text{ and} \quad (34)$$

-continued $$y^{(2)} = H^{(2)}x + n^{(2)} = (H^{(2)}_{CH} \odot H_{PDMA})x + n^{(2)}, \text{ where} \quad (35)$$

$$x^T = [x_1 \; x_2 \; x_3], \quad (36)$$

$$y^{(1)T} = [y_1^{(1)} \; y_2^{(1)}], \quad (37)$$

$$y^{(2)T} = [y_1^{(2)} \; y_2^{(2)}], \quad (38)$$

$$n^{(1)T} = [n_1^{(1)} \; n_2^{(1)}], \quad (39)$$

$$n^{(2)T} = [n_1^{(2)} \; n_2^{(2)}], \quad (40)$$

$$H^{(1)}_{CH} = \begin{bmatrix} h^{(1)}_{1,1} & h^{(1)}_{1,2} & h^{(1)}_{1,3} \\ h^{(1)}_{2,1} & h^{(1)}_{2,2} & h^{(1)}_{2,3} \end{bmatrix}, \quad (41)$$

$$H^{(2)}_{CH} = \begin{bmatrix} h^{(2)}_{1,1} & h^{(2)}_{1,2} & h^{(2)}_{1,3} \\ h^{(2)}_{2,1} & h^{(2)}_{2,2} & h^{(2)}_{2,3} \end{bmatrix}, \quad (42)$$

$$H^{(1)} = \begin{bmatrix} h^{(1)}_{1,1} & h^{(1)}_{1,2} & 0 \\ h^{(1)}_{2,1} & 0 & h^{(1)}_{2,3} \end{bmatrix} \text{ and} \quad (43)$$

$$H^{(2)} = \begin{bmatrix} h^{(2)}_{1,1} & h^{(2)}_{1,2} & 0 \\ h^{(2)}_{2,1} & 0 & h^{(2)}_{2,3} \end{bmatrix}. \quad (44)$$

Figure 5:
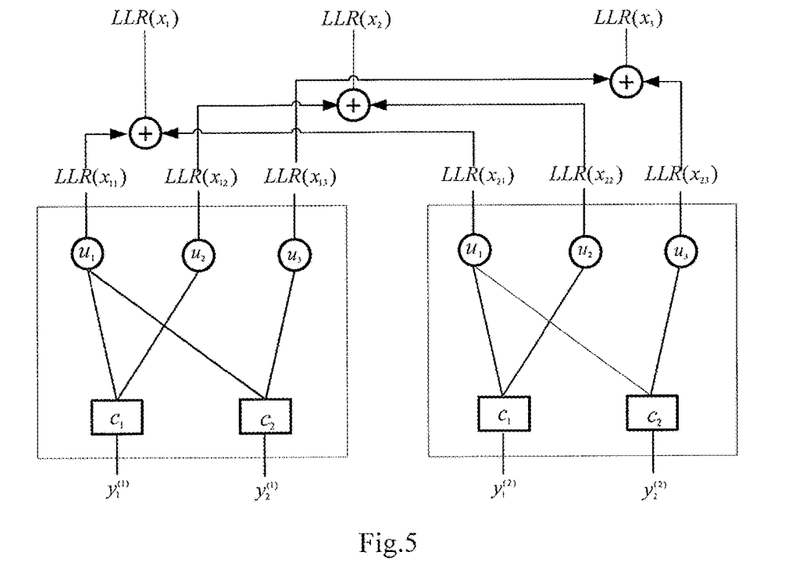
FIG. 5 is a schematic view showing a BP detection procedure in the related art.

During the BP detection using the PDMA system in the related art, the signal to be transmitted by each antenna may be detected using the signal received by the antennae through the BP algorithm on the basis of the model shown by above-mentioned equations (34) and (35), and the LLRs for all the reception antennae may be combined after the detection, and then the turbo decoding operation may be performed. In other words, antenna 1 may use the received signals $y_1^{(1)}$, $y_2^{(1)}$ to detect the transmitted signals $x_{11}, x_{12}, x_{13}$, antenna 2 may use the received signals $y_1^{(2)}$, $y_2^{(2)}$ to detect the transmitted signals $x_{21}, x_{22}, x_{23}$, and then the transmitted signals $x_{11}, x_{12}, x_{13}$ and $x_{21}, x_{22}, x_{23}$ may be combined, so as to acquire the transmitted signals $x_1, x_2, x_3$ that have been finally detected. FIG. 5 shows the BP detection in the related art.

Taking UE1 as an example, the LLR may be calculated through the following equation:

$$LLR(x_1) = LLR(x_{11}) + LLR(x_{21}) = \quad (45)$$
$$\left[ \min_{x \in D^{(+1)}_{i,j}} (\|y^{(1)} - H^{(1)}x\|_2^2) - \min_{x \in D^{(-1)}_{i,j}} (\|y^{(1)} - H^{(1)}x\|_2^2) \right] +$$
$$\left[ \min_{x \in D^{(+1)}_{i,j}} (\|y^{(2)} - H^{(2)}x\|_2^2) - \min_{x \in D^{(-1)}_{i,j}} (\|y^{(2)} - H^{(2)}x\|_2^2) \right].$$

It can be seen by comparing FIG. 3 with FIG. 5 that, although the BP detection method in the embodiments of the present disclosure and the BP detection method in the related art have an identical number of variable nodes, i.e., 3 (e.g., nodes u in the figures), for the former, there are 4 observer nodes (e.g., nodes c in the FIG. 5), while for the latter, there are 2 observer nodes. In other words, the BP detection method in the embodiments of the present disclosure may have all the observer nodes doubling those of the detection method in the related art. In this way, it is able to use all the received signals as an input parameter for the detection method, and facilitate the complete information action between the observer nodes and the variable nodes, thereby to improve the detection accuracy.

On the basis of a mutual information theory, in the case that the channels from the transmitters to the antennae at the receiving end are separate from each other, the BP detection method in the embodiments of the present disclosure may have performance equivalent to the BP detection method in the related art. However, in the case that there is correlation between the channels from the transmitters to the antennae at the receiving end, the BP detection method in the embodiments of the present disclosure may have performance better than the BP detection method in the related art.

The above description is given by taking the BP detection method as an example. Of course, the same technical effect may be achieved by replacing the BP detection method as an IDD detection method.

Figure 6:
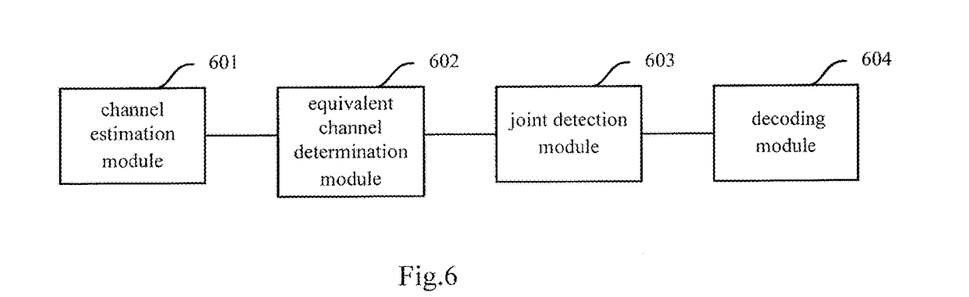
FIG. 6 is a schematic view showing a signal detection device in some embodiments of the present disclosure.

Based on an identical inventive concept, the present disclosure further provides in some embodiments a signal detection device As shown in FIG. 6, the signal detection device may include a channel estimation module 601, an equivalent channel determination module 602, a joint detection module 603 and decoding module 604. The channel estimation module 601 is configured to perform channel estimation based on a signal received by each of antennae to acquire a channel estimation matrix for all transmitters multiplexing on identical time-frequency resources on each of the antennae. The equivalent channel determination module 602 is configured to determine an equivalent PDMA channel estimation matrix for each of the antennae based on a PDMA encoding matrix and the channel estimation matrix for all the transmitters multiplexing on the identical time-frequency resources on each of the antennae, and acquire an equivalent multi-antenna PDMA channel estimation matrix for the antennae based on the equivalent PDMA channel estimation matrix for each of the antennae. The joint detection module 603 is configured to perform a joint detection based on the equivalent multi-antenna PDMA channel estimation matrix, an equivalent multi-antenna received signal vector and a set of constellation points of the transmitters multiplexing on the identical time-frequency resources to acquire LLRs for all the transmitters, where the equivalent multi-antenna received signal vector is formed based on the signals received by the antennae. The decoding module 604 is configured to decode the LLRs for all the transmitters to acquire multi-user information at transmitting end.

Optionally, the equivalent channel determination module 602 may be further configured to perform calculation based on the channel estimation matrix for all the transmitters for transmission that have multiplexed on the identical time-frequency resources for each antenna and the PDMA encoding matrix through the above-mentioned equation (5), so as to acquire the equivalent PDMA channel estimation matrix for each antenna. The equation (5) and the parameters thereof may refer to those mentioned above, and thus will not be particularly defined herein.

Optionally, the joint detection module 603 may be further configured to: determine whether the equivalent multi-antenna PDMA channel estimation matrix and the equivalent multi-antenna received signal vector are to be linearly transformed, based on a characteristic of the equivalent multi-antenna PDMA channel estimation matrix; and in the case that the equivalent multi-antenna PDMA channel estimation matrix and the equivalent multi-antenna received signal vector are to be linearly transformed, linearly transform the equivalent multi-antenna PDMA channel estimation matrix and the equivalent multi-antenna received signal vector, and perform the joint detection based on the equivalent multi-antenna PDMA channel estimation matrix and the equivalent multi-antenna received signal vector which are linearly transformed and the set of constellation points of the transmitters multiplexing on the identical time-frequency resources to acquire the LLRs for the transmitters.

The joint detection module 603 may be further configured to: in the case that a ratio of the number of elements each having a value of 0 in the equivalent multi-antenna PDMA channel estimation matrix to the number of all the elements is smaller than or equal to a decision threshold and the number of rows of the equivalent multi-antenna PDMA channel estimation matrix is greater than or equal to the number of columns of the equivalent multi-antenna PDMA channel estimation matrix, determine to linearly transform the equivalent multi-antenna PDMA channel estimation matrix and the equivalent multi-antenna received signal vector.

Optionally, the joint detection module 603 may be further configured to perform QR decomposition on the equivalent multi-antenna PDMA channel estimation matrix.

Optionally, the joint detection module 603 may be further configured to perform the joint detection using a BP detection algorithm or an IDD detection algorithm.

Based on an identical inventive concept, the present disclosure further provides in some embodiments a communication device which may be a base station, a UE, or any other device having a capability of receiving and processing a wireless signal.

Figure 7:
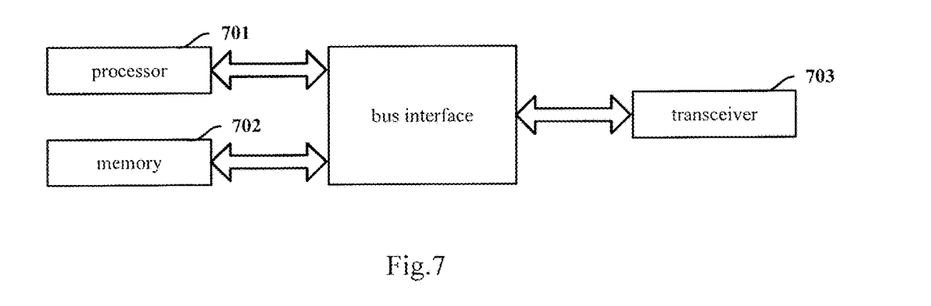
FIG. 7 is another schematic view showing the signal detection device in some embodiments of the present disclosure.

As shown in FIG. 7, the communication device may include a processor 701, a memory 702, a transceiver 703 and a bus interface.

The processor 701 may take charge of managing the bus architecture as well as general processing. The memory 702 may store therein data for the operation of the processor 701. The transceiver 703 may be configured to receive and transmit data under the control of the processor 701.

In FIG. 7, bus architecture represented by a bus may include a number of buses and bridges connected to each other, so as to connect various circuits for one or more processors 701 and one or more memories 702. In addition, as is known in the art, the bus architecture may be used to connect any other circuits, such as a circuit for a peripheral device, a circuit for a voltage stabilizer and a power management circuit. Bus interfaces are provided, and the transceiver 703 may consist of one or more elements, i.e., a plurality of transmitters and a plurality of receivers for communication with any other devices over a transmission medium. The processor 701 may take charge of managing the bus architecture as well as general processing. The memory 702 may store therein data for the operation of the processor 701.

The processor 701 may be further configured to read a program stored in the memory 702, so as to: perform channel estimation based on a signal received by each of antennae, to acquire a channel estimation matrix for all transmitters multiplexing on identical time-frequency resources on each of the antennae, determine an equivalent PDMA channel estimation matrix for each of the antennae based on a PDMA encoding matrix and the channel estimation matrix for all the transmitters multiplexing on the identical time-frequency resources on each of the antennae, and acquire an equivalent multi-antenna PDMA channel estimation matrix for all the antennae based on the equivalent PDMA channel estimation matrix for each of the antennae, perform a joint detection based on the equivalent multi-antenna PDMA channel estimation matrix, an equivalent multi-antenna received signal vector and a set of constellation points of the transmitters multiplexing on the identical time-frequency resources, to acquire LLRs for all the transmitters, where the equivalent multi-antenna received signal vector is formed based on the signals received by the antennae, and decode the LLRs for all the transmitters, to acquire multi-user information at transmitting end.

Optionally, the processor 701 may be further configured to perform calculation based on the channel estimation matrix for all the transmitters for transmission that have multiplexed on the identical time-frequency resources for each antenna and the PDMA encoding matrix through the above-mentioned equation (5), so as to acquire the equivalent PDMA channel estimation matrix for each antenna. The equation (5) and the parameters thereof may refer to those mentioned above, and thus will not be particularly defined herein.

Optionally, the processor 701 may be further configured to: determine whether the equivalent multi-antenna PDMA channel estimation matrix and the equivalent multi-antenna received signal vector are to be linearly transformed, based on a characteristic of the equivalent multi-antenna PDMA channel estimation matrix; and in the case that the equivalent multi-antenna PDMA channel estimation matrix and the equivalent multi-antenna received signal vector are to be linearly transformed, linearly transform the equivalent multi-antenna PDMA channel estimation matrix and the equivalent multi-antenna received signal vector, and perform the joint detection based on the equivalent multi-antenna PDMA channel estimation matrix and the equivalent multi-antenna received signal vector which are linearly transformed and the set of constellation points of the transmitters multiplexing on the identical time-frequency resources to acquire the LLRs for all the transmitters.

The processor 701 may be further configured to: in the case that a ratio of the number of elements each having a value of 0 in the equivalent multi-antenna PDMA channel estimation matrix to the number of all the elements is smaller than or equal to a decision threshold and the number of rows of the equivalent multi-antenna PDMA channel estimation matrix is greater than or equal to the number of columns of the equivalent multi-antenna PDMA channel estimation matrix, determine to linearly transform the equivalent multi-antenna PDMA channel estimation matrix and the equivalent multi-antenna received signal vector.

Optionally, the processor 701 may be further configured to perform QR decomposition on the equivalent multi-antenna PDMA channel estimation matrix.

Optionally, the processor 701 may be further configured to perform the joint detection using a BP detection algorithm or an IDD detection algorithm.

In a word, according to the embodiments of the present disclosure, as compared with the conventional multi-antenna BP detection method, it is able for the BP detection method in the embodiments of the present disclosure to increase the information redundancy by full use of the mutual information about the received signal and the channel among the antennae, so as to improve the detection performance and increase the total system throughput. In the case that the antennae are completely separate from each other, the signal detection method in the embodiments of the present disclosure may have the performance equivalent to the conventional multi-antenna BP detection method, and in the case that there is the correlation between the antennae, the signal detection method in the embodiments of the present disclosure may have the performance better than the conventional multi-antenna BP detection method.

In the case of a 1Tx2Rx and 2RE3UE transmission mode, the number of the observer nodes for the signal detection method in the embodiments of the present disclosure may be 4, while the number of the observer nodes for the conventional BP detection method may be 2. In other words, the number of the observer nodes for the signal detection method in the embodiments of the present disclosure is twice that for the conventional BP detection method. As a result, it is able to use all the received signals as the input parameter for the detection algorithm and facilitate the complete information interaction between the observer nodes and the variable nodes, thereby to improve the detection accuracy.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments based on the basic concept of the present disclosure. So, the attached claims are intended to include the preferred embodiments and all of the modifications and alterations that fall within the scope of the present disclosure.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A signal detection method, comprising:
performing channel estimation based on a signal received by each of antennae, to acquire a channel estimation matrix for transmitters multiplexing on identical time-frequency resources on each of the antennae;
determining an equivalent Pattern Division Multiple Access (PDMA) channel estimation matrix for each of the antennae based on a PDMA encoding matrix and the channel estimation matrix for the transmitters multiplexing the identical time-frequency resources on each of the antennae, and acquiring an equivalent multi-antenna PDMA channel estimation matrix for the antennae based on the equivalent PDMA channel estimation matrix for each of the antennae;
performing a joint detection based on the equivalent multi-antenna PDMA channel estimation matrix, an equivalent multi-antenna received signal vector and a set of constellation points of the transmitters multiplexing on the identical time-frequency resources, to acquire Log Likelihood Ratios (LLRs) for the transmitters, wherein the equivalent multi-antenna received signal vector is formed based on the signals received by the antennae; and
decoding the LLRs for the transmitters, to acquire multi-user information at transmitting end.

2. The signal detection method according to claim 1, wherein the determining the equivalent PDMA channel estimation matrix for each of the antennae based on the PDMA encoding matrix and the channel estimation matrix for the transmitters multiplexing on the identical time-frequency resources on each of the antennae comprises:
performing a calculation based on the channel estimation matrix for the transmitters multiplexing on the identical time-frequency resources on each of the antennae and the PDMA encoding matrix to acquire the equivalent PDMA channel estimation matrix for each of the antennae through an equation: $\hat{H}_{PDMA}^{(n_R)} = H_{PDMA,Pattern} \odot \hat{H}_{CH,Data}^{(n_R)}$, wherein $\hat{H}_{PDMA}^{(n_R)}$ represents the equivalent PDMA channel estimation matrix for the $(n_R)^{th}$ antenna, $\hat{H}_{CH,Data}^{(n_R)}$ represents the channel estimation matrix for the transmitters multiplexing on the identical time-frequency resources on the $(n_R)^{th}$ antenna, $H_{PDMA,Pattern}$ represents the PDMA encoding matrix, and $\odot$ represents multiplying corresponding elements in the $H_{PDMA,Pattern}$ and the $\hat{H}_{CH,Data}^{(n_R)}$ by each other.

3. The signal detection method according to claim 1, wherein the performing the joint detection based on the equivalent multi-antenna PDMA channel estimation matrix, the equivalent multi-antenna received signal vector and the set of constellation points of the transmitters multiplexing on the identical time-frequency resources to acquire the LLRs for the transmitters comprises:
determining whether the equivalent multi-antenna PDMA channel estimation matrix and the equivalent multi-antenna received signal vector are to be linearly transformed, based on a characteristic of the equivalent multi-antenna PDMA channel estimation matrix; and
in the case that the equivalent multi-antenna PDMA channel estimation matrix and the equivalent multi-antenna received signal vector are to be linearly transformed, linearly transforming the equivalent multi-antenna PDMA channel estimation matrix, the equivalent multi-antenna received signal vector, and performing the joint detection based on the equivalent multi-antenna PDMA channel estimation matrix and the equivalent multi-antenna received signal vector which are linearly transformed, and the set of constellation points of the transmitters multiplexing on the identical time-frequency resources, to acquire the LLRs for the transmitters.

4. The signal detection method according to claim 3, wherein the determining whether the equivalent multi-antenna PDMA channel estimation matrix and the equivalent multi-antenna received signal vector are to be linearly transformed, based on a characteristic of the equivalent multi-antenna PDMA channel estimation matrix comprises:
in the case that a ratio of the number of elements each having a value of 0 in the equivalent multi-antenna PDMA channel estimation matrix to the number of all the elements is smaller than or equal to a decision threshold, and the number of rows of the equivalent multi-antenna PDMA channel estimation matrix is greater than or equal to the number of columns of the equivalent multi-antenna PDMA channel estimation matrix, determining to linearly transform the equivalent multi-antenna PDMA channel estimation matrix and the equivalent multi-antenna received signal vector.

5. The signal detection method according to claim 3, wherein the linearly transforming the equivalent multi-antenna PDMA channel estimation matrix comprises:
performing quadrature rectangle (QR) decomposition on the equivalent multi-antenna PDMA channel estimation matrix.

6. The signal detection method according to claim 1, wherein the joint detection comprises performing the joint detection through a Belief Propagation (BP) detection algorithm or an Iterative Detection and Decoding (IDD) detection algorithm.

7. A signal detection device, comprising:
a channel estimation module, configured to perform channel estimation based on a signal received by each of antennae to acquire a channel estimation matrix for transmitters multiplexing on identical time-frequency resources on each of the antennae;
an equivalent channel determination module, configured to determine an equivalent Pattern Division Multiple Access (PDMA) channel estimation matrix for each of the antennae based on a PDMA encoding matrix and the channel estimation matrix for the transmitters multiplexing on the identical time-frequency resources on each of the antennae, and acquire an equivalent multi-antenna PDMA channel estimation matrix for the antennae based on the equivalent PDMA channel estimation matrix for each of the antennae;
a joint detection module, configured to perform a joint detection based on the equivalent multi-antenna PDMA channel estimation matrix, an equivalent multi-antenna received signal vector and a set of constellation points of the transmitters multiplexing on the identical time-frequency resources to acquire Log Likelihood Ratios (LLRs) for the transmitters, wherein the equivalent multi-antenna received signal vector is formed based on the signals received by the antennae; and
a decoding module, configured to decode the LLRs for the transmitters to acquire multi-user information at the transmitting end.

8. The signal detection device according to claim 7, wherein the equivalent channel determination module is further configured to perform a calculation based on the channel estimation matrix for the transmitters multiplexing on the identical time-frequency resources on each of the antennae and the PDMA encoding matrix to acquire the equivalent PDMA channel estimation matrix for each of the antennae through an equation: $\hat{H}_{PDMA}^{(n_R)} = H_{PDMA,Pattern} \odot \hat{H}_{CH,Data}^{(n_R)}$, wherein $\hat{H}_{PDMA}^{(n_R)}$ represents the equivalent PDMA channel estimation matrix for the $(n_R)^{th}$ antenna, $\hat{H}_{CH,Data}^{(n_R)}$ represents the channel estimation matrix for the transmitters multiplexing on the identical time-frequency resources on the $(n_R)^{th}$ antenna, $H_{PDMA,Pattern}$ represents the PDMA encoding matrix, and $\odot$ represents multiplying corresponding elements in the $H_{PDMA,Pattern}$ and the $\hat{H}_{CH,Data}^{(n_R)}$ by each other.

9. The signal detection device according to claim 7, wherein the joint detection module is further configured to:
determine whether the equivalent multi-antenna PDMA channel estimation matrix and the equivalent multi-antenna received signal vector are to be linearly transformed, based on a characteristic of the equivalent multi-antenna PDMA channel estimation matrix; and
in the case that the equivalent multi-antenna PDMA channel estimation matrix and the equivalent multi-antenna received signal vector are to be linearly transformed, linearly transform the equivalent multi-antenna PDMA channel estimation matrix, the equivalent multi-antenna received signal vector, and perform the joint detection based on the equivalent multi-antenna PDMA channel estimation matrix, and the equivalent multi-antenna received signal vector which are linearly transformed and the set of constellation points of the transmitters multiplexing on the identical time-frequency resources to acquire the LLRs for the transmitters.

10. The signal detection device according to claim 9, wherein the joint detection module is further configured to, in the case that a ratio of the number of elements each having a value of 0 in the equivalent multi-antenna PDMA channel estimation matrix to the number of all the elements is smaller than or equal to a decision threshold, and the number of rows of the equivalent multi-antenna PDMA channel estimation matrix is greater than or equal to the number of columns of the equivalent multi-antenna PDMA channel estimation matrix, determine to linearly transform the equivalent multi-antenna PDMA channel estimation matrix and the equivalent multi-antenna received signal vector.

11. The signal detection device according to claim 9, wherein the joint detection module is further configured to perform quadrature rectangle (QR) decomposition on the equivalent multi-antenna PDMA channel estimation matrix.

12. The signal detection device according to claim 7, wherein the joint detection module is further configured to perform the joint detection through a Belief Propagation (BP) detection algorithm or an Iterative Detection and Decoding (IDD) detection algorithm.

13. A signal detection device, comprising a processor, a transceiver and a memory, wherein
the processor is configured to read a program stored in the memory to:
perform channel estimation based on a signal received by each of antennae, to acquire a channel estimation matrix for transmitters multiplexing on identical time-frequency resources on each of the antennae,
determine an equivalent Pattern Division Multiple Access (PDMA) channel estimation matrix for each of the antennae based on a PDMA encoding matrix and the channel estimation matrix for the transmitters multiplexing on the identical time-frequency resources on each of the antennae, and acquire an equivalent multi-antenna PDMA channel estimation matrix for the antennae based on the equivalent PDMA channel estimation matrix for each of the antennae,
perform a joint detection based on the equivalent multi-antenna PDMA channel estimation matrix, an equivalent multi-antenna received signal vector and a set of constellation points of the transmitters multiplexing on the identical time-frequency resources, to acquire Log Likelihood Ratios (LLRs) for the transmitters, wherein the equivalent multi-antenna received signal vector is formed based on the signals received by the antennae, and decode the LLRs for the transmitters, to acquire multi-user information at the transmitting end;

the transceiver is configured to receive and transmit data; and the memory is configured to store data for the operation of the processor.

\* \* \* \* \*